Sept. 23, 1924.
E. J. LEES
ADJUSTABLE BEARING
Filed May 23, 1919
1,509,677
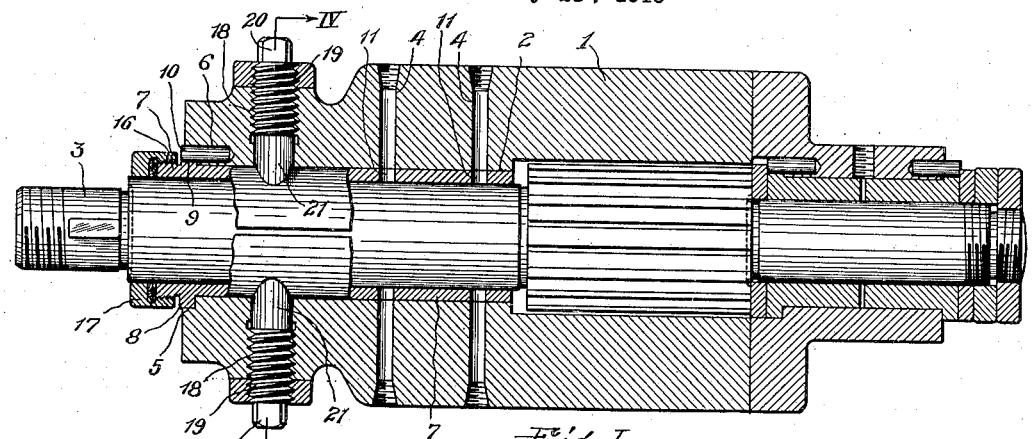
Fig. I
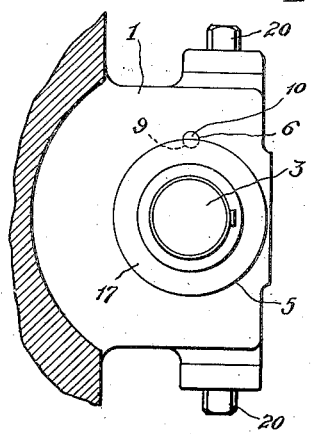
Fig. II
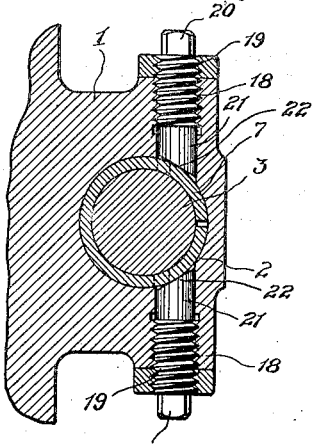
Fig. IV
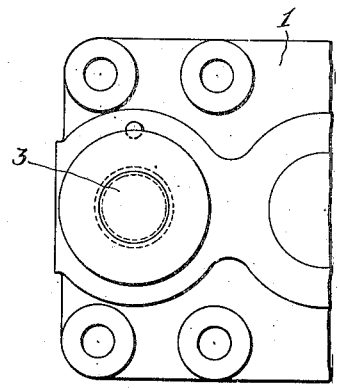
Fig. III
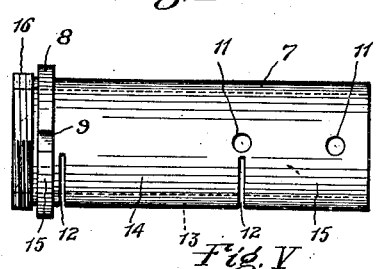
Fig. V
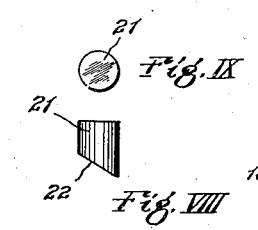
Fig. IX
Fig. VIII
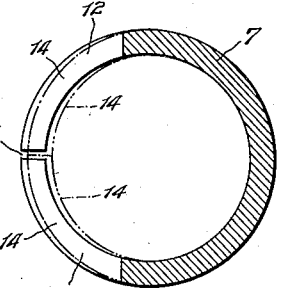
Fig. X
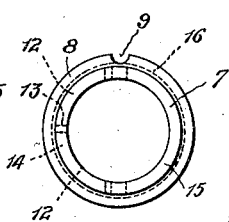
Fig. VI
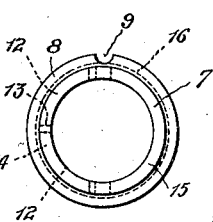
Fig. VII
Inventor
ERNEST J. LEES
by his atty.

Patented Sept. 23, 1924.

1,509,677

UNITED STATES PATENT OFFICE.

ERNEST J. LEES, OF CLEVELAND, OHIO, ASSIGNOR TO THE LEES-BRADNER COMPANY, OF CLEVELAND, OHIO, A CORPORATION OF OHIO.

ADJUSTABLE BEARING.

Application filed May 23, 1919. Serial No. 299,215.

*To all whom it may concern:*

Be it known that I, ERNEST J. LEES, a citizen of the United States, residing at 6210 Carnegie Ave., in the city of Cleveland, county of Cuyahoga, and State of Ohio, have invented a new and useful Improvement in Adjustable Bearings, of which the following is a specification, the principle of the invention being herein explained and the best mode in which I have contemplated applying that principle, so as to distinguish it from other inventions.

My invention pertains to an adjustable bearing and more particularly to means whereby an interior bushing may be varied as to the size of its bore.

I am cognizant of several prior marketed constructions for adjusting bearings, notably the following forms:—

1. Both bearing support and bushing split on one side, the support being provided with flanges and means for drawing the flanges together.

2. Both bearing support and bushing split on diametrically opposite sides and arranged to be drawn together by a pair of similarly disposed cap screws.

3. Complementarily tapered surfaces adapted to be brought into engagement by relative axial movement.

4. A tapered bushing split from both ends so that the inner ends of the split pass each other.

All of these earlier constructions failed to preclude the possibility of grit finding lodgment on the wearing surfaces.

In machine tools the cutter spindle is subjected to strains which eventually produce considerable chatter. Even though an adjusted bearing is not theoretically correct owing to its distortion from true cylindrical form, and even though an adjusted or lopsided bushing necessarily wears unevenly and therefore more rapidly, such disadvantages are more than offset, at least in the case of machine tool spindles, by the avoidance of vibration and chatter. This is verified by practical demonstrations extending over a period of more than a year.

One object of my invention is to avoid vibration and rattle owing to looseness of the bearing about a shaft movably mounted therein. Another object is to provide a take-up bushing which does not have a split section terminating at either end along which grit or dust can find entry to the wearing surfaces. Besides the foregoing, I have provided means for sealing both ends of the bushing to absolutely preclude the entry of foreign substances.

Adverting to the drawings:—

Fig. I is an axial mainly section of a bearing embodying one exemplification of the features of my invention.

Fig. II is a left end elevation.

Fig. III is a right end elevation.

Fig. IV is a cross section on line IV—IV of Fig. I.

Figs. V and VI are detail elevations of the bushing viewed from relatively transverse direction.

Fig. VII is an end elevation of the bushing.

Figs. VIII and IX are side and end elevations respectively, of a detail.

Fig. X is an enlarged section of the bushing showing its partially constructed form in dotted lines.

Inasmuch as my invention relates to certain features only, of the entire construction shown in Figure 1, such details of construction as are impertinent will not be described.

A bearing support 1 is provided with a bore 2 through which a spindle 3 extends. Extending radially through the bearing are a pair of oil ducts 4.

One end of the bore 2 is countersunk at 5 and opening into it is a drill hole 6. Interposed between the bore 2 and the spindle 3 is a spring-expansible bushing 7 having a collar 8 adapted to fit the countersink 5. The collar 8 is fashioned with a groove 9 as shown in Figures V and VII, through which a key 10 enters the hole 6 as clearly appears in Figures I and II. When the bearing and bushing are so locked together a pair of radial openings 11 with which the bushing is formed register with the ducts 4 as may be seen upon an inspection of Figure I.

According to my invention the bushing 7 is of the spring-expansible type, but the resilient area is confined to an intermediate section owing to a pair of circumferentially extending slots 12 spaced a certain distance from the ends of the bushing and an interjacent slot 13 all of which are illustrated in Figure VI. In consequence the end sections of the bushing, beyond the slots 12, are continuous or unbroken circumferentially and between such sections, a pair of rectangular cylindrically surfaced lips 14 are provided which may be flexed without disturbing the maintenances of two perfectly cylindrical end portions 15 of the bushing. This affords the desired true and steadying fit at both ends and assures the great advantage of making more difficult the entry of abrasive substances. The collar 8 further insures against such an occurence. Besides, I provide that end of the bushing adjacent the collar 8 with screw threads 16 for the attachment of a stuffing box 17 which absolutely seals the end of the lubricated surfaces.

Extending through diametrically opposed screw-threaded openings 18 formed in the bearing support 1 are a pair of set-screws 19 with hexagonal heads 20 and having cylindrical inner ends 21 of somewhat reduced diameter adapted to engage and move members having oblique end surfaces 22 as appears in Figures IV and VIII. As will be readily understood the surfaces 22 are adapted to have tangential engagement with the bushing 7 on opposite sides of the slot 13 and substantially midway of its length so that a turning of the screws 19 acts to constrict the bushing. By slotting the bushing in the manner shown its constriction may be effected with approximate uniformity over the predetermined peripheral area enclosed by the slots 12. It will be manifest that a spindle or shaft confined within a bearing adjustable according to the scheme of my invention may be held snugly enclosed notwithstanding wear of the bushing and its action will be steadied, also that particles likely to abrade the friction surfaces are excluded even, indeed especially when the bushing is partially expanded.

Aside from the fact that the outer end of the bushing 7 is continuous and therefore prevents entrance of foreign matter into the bearing as already set forth, such construction also permits the ready attachment of a stuffing box without danger of its getting loose, while at the same time, by means of the intermediate flexible sections 14, I am enabled to adjust the bushing into proper engagement with the shaft 3.

To those skilled in the art to which my invention relates, many alterations in construction and widely differing embodiments and applications of the invention will suggest themselves without departing from the spirit and scope thereof. My disclosures and the description herein are purely illustrative and are not intended to be in any sense limiting.

I claim:—

1. In a device of the character described, the combination with a support formed with a cylindrical bore and an opening leading through the wall of the support into said bore, of a bushing of cylindrical shape from end to end, the body portion of said bushing being formed with a pair of slits extending in a substantially circumferential direction and a longitudinally extending slit connected at its ends with said circumferential slits to provide an adjustable flexible section in the body portion of said bushing and continuous unbroken end sections fitting the wall of said bore, and means extending through said opening in the support to engage with and adjust said flexible section relative to said end sections of said bushing.

2. In a device of the character described, the combination with a support formed with a cylindrical bore and an opening leading through the wall of said support into the bore, of a bushing of cylindrical shape from end to end, the body portion of said bushing being formed with a pair of slits extending in a substantially circumferential direction and a longitudinally extending slit connected at its ends with said circumferential slits to provide an adjustable flexible section in the body portion of said bushing and continuous unbroken end sections fitting said bore, and means extending through said opening in the support to engage with and adjust said flexible section relative to said end sections of the bushing, said adjusting means comprising a thrust member and a screw engaging with said thrust member for operating it.

3. In a device of the character described, the combination with a support formed with a bore and openings leading through the wall of said support into said bore, of a bushing of cylindrical shape from end to end and formed with a pair of circumferential slits and a longitudinal slit connected at its opposite ends to said circumferential slits intermediate their ends to provide at opposite sides of said longitudinally extending slit a pair of adjustable flexible sections in the body portion of said bushing and continuous unbroken end sections, and means extending through said openings to engage with and independently adjust said flexible sections relative to said end sections of the bushing.

Signed by me, this 22nd day of May, 1919.

ERNEST J. LEES.